W. A. STEELE.
GRADER AND DITCHER.
APPLICATION FILED APR. 16, 1918.

1,317,602.

Patented Sept. 30, 1919.
2 SHEETS—SHEET 1.

Witness
Wm. C. Dashiell

Inventor
William A. Steele
By Louis Bagger
his Attorney

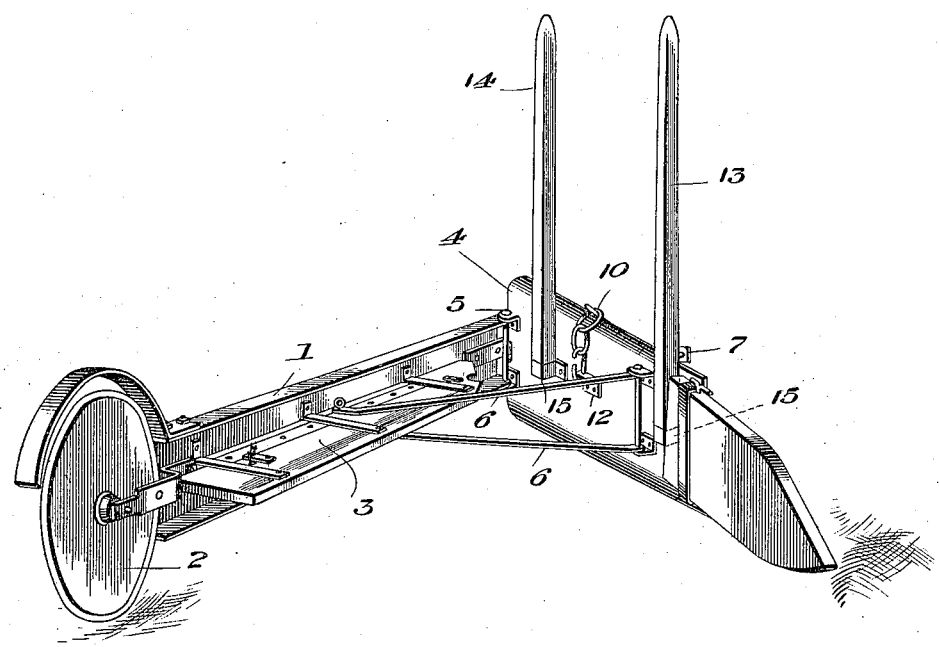

UNITED STATES PATENT OFFICE.

WILLIAM A. STEELE, OF OWENSBORO, KENTUCKY.

GRADER AND DITCHER.

1,317,602.  Specification of Letters Patent.  Patented Sept. 30, 1919.

Application filed April 16, 1918. Serial No. 228,979.

*To all whom it may concern:*

Be it known that I, WILLIAM ALEXANDER STEELE, a citizen of the United States of America, residing at Owensboro, in the county of Daviess and State of Kentucky, have invented certain new and useful Improvements in Graders and Ditchers, of which the following is a specification.

This invention relates to an improvement in graders and ditchers and is of the general type of the machine set forth in Letters Patent Nos. 1,185,358 and 1,185,359, granted to William R. Williams May 30, 1916, the present invention comprising, in the main, a runner beam, a reversible cutting blade connected therewith, a hitch bar and means for connecting the hitch bar directly at the one point and flexibly at another with said runner beam and connecting blade.

In the accompanying drawings:

Fig. 2 is a similar view from the rear.

Figure 1:
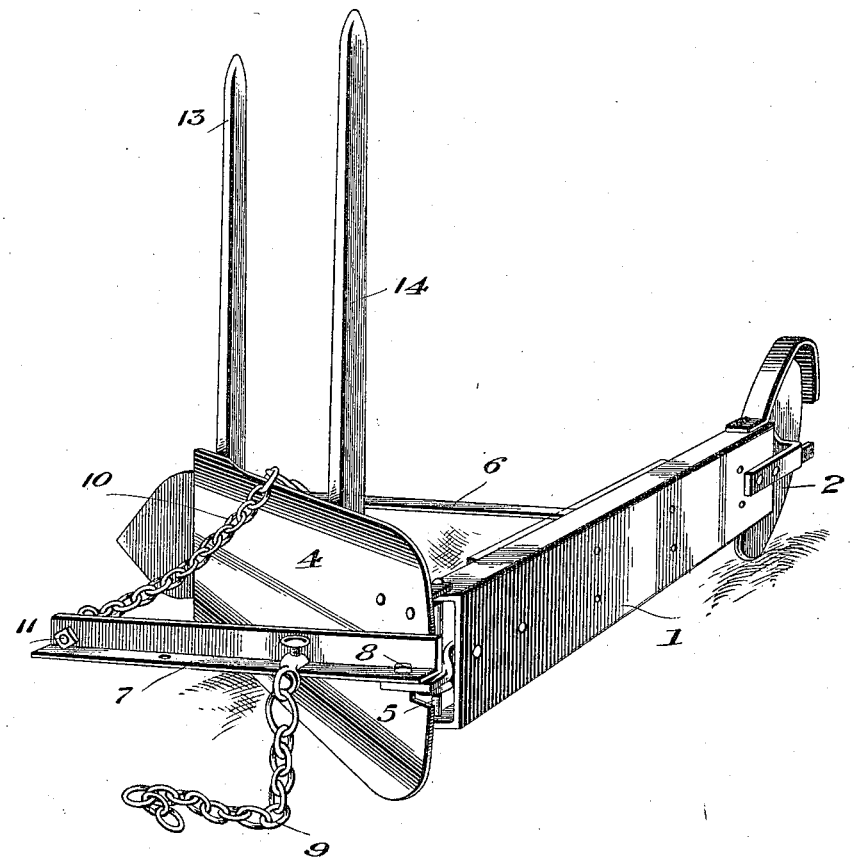
Figure 1 is a view in perspective from the front.

The numeral 1, represents the structural channel runner beam mounted preferably at its rear end on a wheel or disk 2 that follows the ditch and having on the inner side the usual platform 3, upon which the driver stands.

The numeral 4, represents the reversible cutting blade which is pivotally connected at its forward end by a bolt 5 passing through holes in short angles riveted to the cutting-blade and the forward end of the runner beam 1, and a set of two brace bars 6, extends across between the runner beam and cutting blade.

A hitch bar 7, preferably made of angle iron or other strong material is pivoted by a bolt 8, at the apex of the ditcher or grader as shown in Fig. 1 and to this the draft animals or tractor are fastened by a chain or other means 9.

A chain or flexible connection 10, is connected with the outer end of the hitch bar by a bolt or other means 11 and preferably extends over the upper edge of the reversible blade and its rear end is attached to the rear of the blade as shown at 12, in Fig. 2.

The particular advantage of this chain is that it gives the implement a certain flexibility that is to be desired and admits of the blade being the more easily reversed.

While the preferred form of chain is of seven-sixteenths or one-half inch iron—about 2 feet in length, nevertheless it is intended that this application should cover all forms of chain hitches or fastenings of a flexible character for this part of the implement.

Handles 13 and 14 project upwardly from sockets 15 on the back of the reversible blade for the driver to hold and in operating the ditcher and grader.

More or less slight change might be made in the form and arrangement of the several parts and the invention contemplates this.

Claims:

1. The combination of a runner beam, a cutting blade, a hitch bar connected directly to the forward end of the runner beam and a flexible device extending from the free end of the hitch bar over the blade and fastened at the rear thereof.

2. The combination of a runner beam, a reversible cutting blade, means connecting the two together at the forward end at an angle, a hitch bar pivoted at approximately the point of juncture of the runner beam and blade and a flexible device extending from the free end of the hitch bar over the edge of the cutting blade and secured to the rear thereof, and draft means secured to the hitch bar.

3. In a grader and ditcher an angle iron hitch bar pivotally attached at one end thereto and a flexible connection extending from the other end over the blade and fastened at the rear thereof.

In testimony whereof I affix my signature.

WM. A. STEELE.

Copies of this patent may be obtained for five cents each, by addressing the "Commissioner of Patents, Washington, D. C."